Sept. 29, 1931.  S. W. BLOOM  1,825,174
COFFEEPOT
Filed Dec. 6, 1930
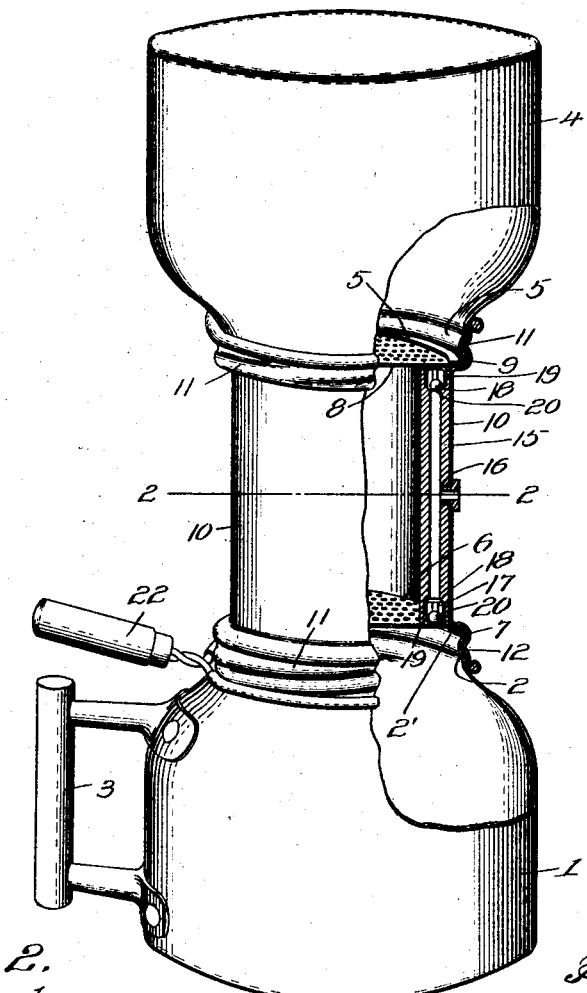
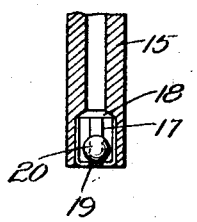
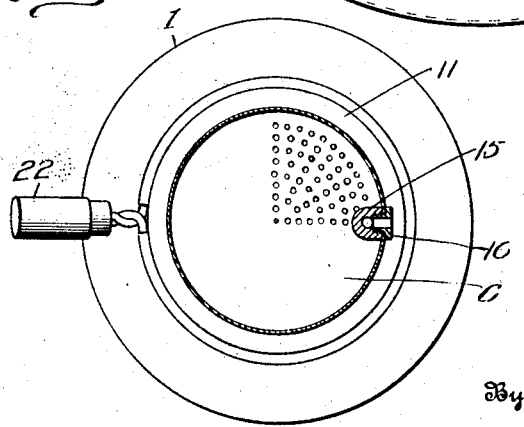
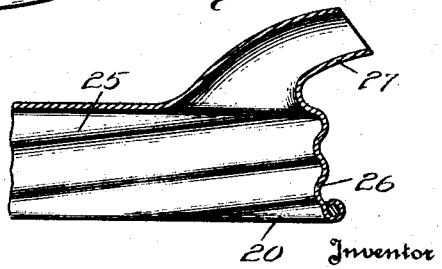
Inventor
Seth W. Bloom
By Ritter, Mechlin & Neill
Attorneys Patented Sept. 29, 1931

1,825,174

UNITED STATES PATENT OFFICE

SETH W. BLOOM, OF DU BOIS, PENNSYLVANIA

COFFEEPOT

Application filed December 6, 1930. Serial No. 500,609.

The invention relates to reversible percolating coffee pots and has for its object to provide a simple and efficient utensil of the type involving end sections or receptacles and an intermediate receptacle separated from the end receptacles by screens and adapted to hold the ground coffee beans, the intermediate receptacle carrying a tube having a lateral air vent intermediate its ends and provided with oppositely acting check valves in its ends, said tube being adapted to establish communication between the end sections to permit the escape of steam from the section being used as a boiler and to permit the breaking of the vacuum formed in said section, when the apparatus is reversed; whereby either end section may be used as a boiler alternately and the boiling water permitted to percolate through the coffee in the intermediate section alternately from either end section and a resultant beverage of any desired strength may be quickly produced. The invention also contemplates the provision of a novel liquid-tight joint between each of the end sections and the intermediate section, which joint also is effective in securing the screens separating the intermediate section from the end sections.

The invention is illustrated in the accompanying drawings, in which:—

Fig. 1 is a perspective elevation, partly in section of the preferred form of the apparatus.

Fig. 2 is a section on line 2—2 of Fig. 1.

Fig. 3 is a detail illustrating one end of the valved tube connecting the upper and lower sections.

Fig. 4 is a fragmentary sectional elevation of a spouted cap to be used in dispensing the beverage.

Referring to the drawings, 1 indicates one end section or receptacle of the percolating coffee pot, which is provided with an open top surrounded by a screw threaded flange 2. The said section 1, when made of metal, may be provided with a suitable handle, such as 3, riveted to the body thereof. Associated with the end section or receptacle 1 is a second terminal section or receptacle 4, which is generally similar to said receptacle 1, having an open throated end defined by a threaded flange 5. Preferably each of the flanges 2 and 5 terminate in horizontal rim-like sections 2' and 5', respectively. The open ends of each of the end sections 1 and 4 are adapted to be spanned by screens or reticulated septa 6 and 8, respectively, which are provided with flanged rims 7 and 9, respectively, which are screw threaded to engage the threads on the necks of the end sections 1 and 4, in the manner and form shown in Fig. 1, the peripheral edges of the screens 6 and 8 engaging the horizontal portions 2' and 5' of the flanges 2 and 5 to effect a liquid-tight seal, when the complete apparatus is assembled. Interposed between the end sections 1 and 4 is an intermediate section or receptacle 10, the body portion of which is substantially cylindrical and is provided at its open ends with angular flanges 11, 11, which are screw threaded to engage the threads on the flanges of the screen members 6 and 8 and, therefore, to cooperate with the screw threaded necks of the end sections or receptacles in locking the three receptacles together, when the apparatus is being used to prepare the beverage. When assembled, it will be seen that the threaded necks of the end sections, the threaded rims of the screens and the threaded terminal flanges of the intermediate section or recepacle are nested together, forming liquid-tight joints, but the several sections are susceptible of being quickly separated and the screens removed from the open ends of the two terminal receptacles to enable all of the parts to be readily and thoroughly cleansed.

Preferably secured to the inner wall of the intermediate receptacle 10 is a tube 15, the open ends of which abut the screens 6 and 8, when the apparatus is assembled, so that said tube will afford communication between the end receptacles. The said tube 15 is provided intermediate its length with a vent opening 16, which communicates with the outer air and which is preferably fitted with a removable nipple, which may serve to lock the tube in position. Each end of the tube 15 is counterbored to provide a valve chamber 17 and a valve seat 18, in which valve chambers are placed check valves 20, preferably in the form of balls of somewhat less diameter than the counterbore. Any suitable means may be provided for retaining the balls within the chambers or counterbores 17 and, as illustrated, this retaining means may take the form of a wire cage 19 secured in the end of the tube. In order to facilitate the separation of the section or receptacle which ultimately receives the beverage to be dispensed and prevent burning the hands of the operator, one of the flanged rims of the intermediate section 20 may be provided with a handle, such as 22, which may be conveniently formed from the twisted ends of the wire contained in the beading about the marginal edge of said flange, as more particularly illustrated in Figs. 1 and 2. Also to facilitate the serving of the beverage, an auxiliary cover 25 having a screw threaded flange 26 to engage the flanged neck of the end receptacle, such as 1, and provided with a spout 7, may be furnished. This ancillary element, however, is merely a matter of convenience, as the beverage may be poured directly from the open throat of the receptacle 1, if desired.

In using the device, the required amount of water is supplied to the lower receptacle, such as 1, and the requisite amount of ground coffee is placed in the intermediate receptacle 10, where it is confined by the screens 7 and 8. The water in the lower receptacle is then brought to a boil, much of the steam passing up through the body of coffee in the intermediate receptacle, but any undue steam pressure being relieved by escape through the tube 15 and the vent opening 16 therein. When the water has come to a boil, which will be evidenced by the escape of steam at said vent opening, the apparatus is reversed, so that section 4 is at the bottom and section 1, containing the boiling water, is at the top and this boiling water passes down through the body of ground coffee, which will then be supported by the screen 8. The percolation of the hot water through the coffee will extract the desired constituents from the latter and this extraction will be facilitated by the preliminary action of the steam on the coffee. As the hot water passes out of the receptacle 1, the vacuum, which tends to form in the latter, will be relieved by air passing through the vent opening 16 and lifting the check valve 20, which is in the end of the tube adjacent the screen 6. If the coffee infusion is not sufficiently strong after one percolating operation, the partial infusion contained in section 4 may be again brought to a boil and the apparatus again reversed. This operation may be continued until the beverage attains the desired strength and flavor, after which section 1, which will normally contain the finished product, is separated from the rest of the apparatus and the coffee either poured out of the open neck thereof or the auxiliary top 25 applied to said neck and the beverage dispensed through the spout 27.

Obviously, the apparatus is not limited to the particular form shown, but may be given any desired shape or configuration as taste and convenience may dictate. The end sections or receptacles may be made of metal, or preferably of suitable glass or other transparent material, particularly when it is desired to observe the character of the infusion at the various stages of the operation.

What I claim is:

1. A percolating coffee pot, comprising two end sections, an intermediate section detachably connecting the end sections, screens between the intermediate and end sections, and a tube having a vent opening and oppositely acting check valves in its ends mounted in the intermediate section and serving to connect the end sections.

2. A percolating coffee pot, comprising two end sections having threaded necks, screens having threaded flanges engaging said necks, an intermediate section having open ends and threaded marginal flanges cooperating with the threaded necks to lock the sections together, and a tube having a vent opening and oppositely acting check valves in its end mounted in the intermediate section and serving to connect the end sections.

In testimony whereof I affix my signature.

SETH W. BLOOM.